United States Patent
Hiwatari

(10) Patent No.: US 6,836,088 B2
(45) Date of Patent: Dec. 28, 2004

(54) MOTOR DRIVING CIRCUIT

(75) Inventor: Minoru Hiwatari, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 23 days.

(21) Appl. No.: 10/463,982

(22) Filed: Jun. 17, 2003

(65) Prior Publication Data
US 2003/0230993 A1 Dec. 18, 2003

(30) Foreign Application Priority Data

Jun. 18, 2002 (JP) ........................................ 2002-177317
Jun. 18, 2002 (JP) ........................................ 2002-177353

(51) Int. Cl.[7] .............................................. H02P 5/00
(52) U.S. Cl. ...................... 318/280; 318/283; 318/286; 318/256; 318/445; 318/465; 318/468; 318/266
(58) Field of Search ................................ 318/280–286, 318/256, 445, 432–434, 465–468, 266–291, 739; 49/22–31

(56) References Cited

U.S. PATENT DOCUMENTS

| | | | | |
|---|---|---|---|---|
| 4,146,826 A | * | 3/1979 | Wojslawowicz | 318/297 |
| 4,678,975 A | * | 7/1987 | Vrabel et al. | 318/266 |
| 5,097,186 A | * | 3/1992 | Kokubu | 318/280 |
| 5,128,597 A | * | 7/1992 | Kokubu | 318/286 |
| 5,138,182 A | * | 8/1992 | Kokubu | 307/10.1 |
| 5,220,634 A | * | 6/1993 | Yaguchi et al. | 388/819 |
| 5,994,797 A | * | 11/1999 | Yamaoka | 307/125 |
| 6,081,085 A | * | 6/2000 | Ohashi et al. | 318/283 |
| 6,104,156 A | * | 8/2000 | Bruno | 318/434 |
| 6,252,363 B1 | * | 6/2001 | Grady | 318/266 |

FOREIGN PATENT DOCUMENTS

| | | | | |
|---|---|---|---|---|
| JP | 2004-023923 | * | 1/2004 | H02P/7/08 |
| JP | 2004-023924 | * | 1/2004 | H02P/7/08 |

* cited by examiner

Primary Examiner—David Martin
Assistant Examiner—Tyrone Smith
(74) Attorney, Agent, or Firm—Brinks Hofer Gilson & Lione

(57) ABSTRACT

A motor driving circuit includes a window opening switch, a window closing switch, an auto switch, a motor which opens and closes a window by driving rotating operation, a charging circuit which charges one capacitance element by a first CR time constant upon operating the window opening switch, and a discharging circuit which sharply charges another capacitance element upon operating the auto switch and which discharges a discharging voltage charged to the other capacitance element by a second CR time constant upon stopping operation of the auto switch. Driving operation of the motor stops when a voltage of the one capacitance element in the charging circuit is higher than a first reference voltage or a voltage of the other capacitance element in the discharging circuit is lower than a second reference voltage during driving the motor.

9 Claims, 2 Drawing Sheets

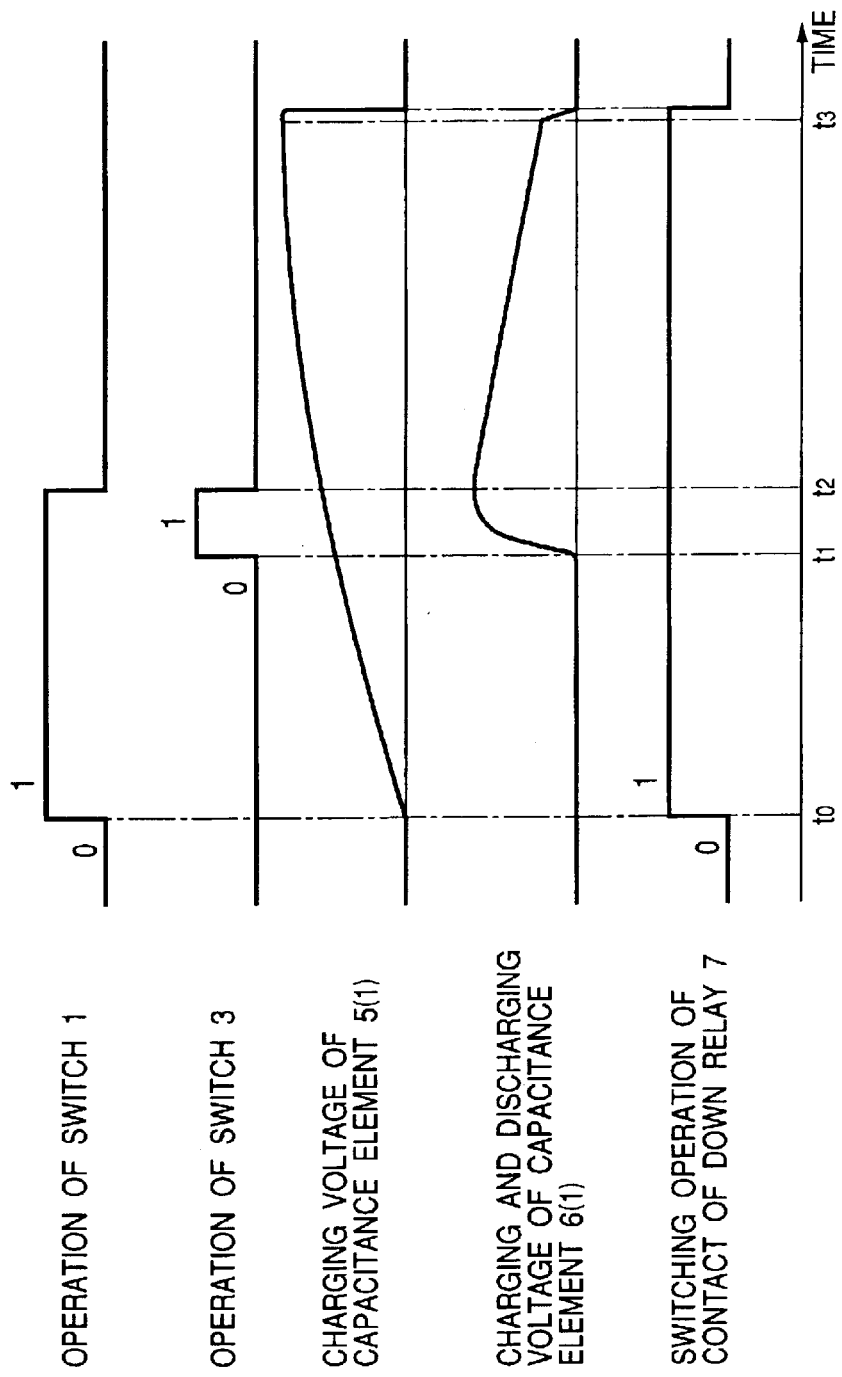

MOTOR DRIVING CIRCUIT

BACKGROUND OF THE INVENTION

1. Field of the Invention

The present invention relates to a motor driving circuit, and more particularly, to a motor driving circuit which controls to maintain driving operation of a motor for opening and closing a window of an automobile for a predetermined time.

2. Description of the Related Art

Conventionally, a window opening and closing mechanism for an automobile includes a window opening and closing motor, a motor driving control circuit which controls a driving operation of the motor, a window opening switch, a window closing switch, and an auto switch.

In the window opening and closing mechanism, the operation of the window opening switch enables one-polar driving current to be supplied to the window opening and closing motor via the motor driving control circuit, the window opening and closing motor rotates in one direction, and the window moves in an opening direction during operating the window opening switch. Further, the operation of the window closing switch enables another-polar driving current to be supplied to the window opening and closing motor via the motor driving control circuit, the window opening and closing motor rotates in another direction, and the window moves in a closing direction during operating the window closing switch.

If the window opening switch is operated, simultaneously therewith, the auto switch is operated, and then the operations of the window opening switch and the auto switch stop, the one-polar driving current is supplied to the window opening and closing motor via the motor driving control circuit, the window opening and closing motor thus rotates, and the window continuously moves in the opening direction. When the window reaches the entire opening position, it stops supplying the one-polar driving current to the window opening and closing motor, the window opening and closing motor stops rotating in the one direction, and the window stops moving. Similarly, if the window closing switch is operated, simultaneously therewith, the auto switch is operated, and then the operations of the window closing switch and the auto switch stop, the other-polar driving current is supplied to the window opening and closing motor via the motor driving control circuit, the window opening and closing motor thus rotates in the other direction, and the window continuously moves in the closing direction. When the window reaches the entire closing position, it stops supplying the other-polar driving current to the window opening and closing motor, the window opening and closing motor stops rotating in the other direction, and the window stops moving.

In the above-mentioned window opening and closing mechanism, the motor driving control circuit needs to switch the driving operation of the motor the window and the stop operation thereof at a proper timing so as to prevent an excessive load to the motor. There have been proposed some well-known motor driving circuits for the above driving operation of the motor.

In the motor driving circuit for detecting the current, a resistor for detecting the current with a low resistance is serially connected to the motor, a motor current which flows to the resistor for detecting the current from both ends thereof is detected as a voltage value, and the detected voltage value is supplied to a detecting circuit. Further, the detecting circuit determines a driving status of the motor based on the supplied voltage value. As a result, when it is determined that the motor stops, an instruction for stopping driving the motor is issued to the motor driving control circuit so as to stop driving the motor by the motor driving control circuit.

Further, a timer-type motor driving circuit uses a charging circuit having a capacitance element which is charged by a CR time constant, in place of detecting the current flowing to the motor. After a predetermined time for charging the capacitance element in the charging circuit, the instruction for stopping driving the motor to the motor driving control circuit is issued so as to stop driving the motor by the motor driving control circuit. At this time point, a voltage comparator compares a reference voltage with a charging voltage charged to the capacitance element in the charging circuit and the passage of the predetermined time is determined by switching the pole of an output as the comparison result of the voltage comparator.

In the well-known motor driving circuit for detecting the current, when a surrounding environment changes due to the variation of surrounding temperature, an operating characteristic of the motor changes and thus the motor current is not detected. The motor current is not always detected with accuracy, thereby entering an erroneously operating status.

In the well-known timer-type motor driving circuit, similarly, when the surrounding environment changes due to the variation of surrounding temperature, the charging circuit having the CR time constant enters the erroneously operating status. In this case, the motor does not stop driving at the time for stopping driving the motor and the motor stops driving before the time for stopping driving the motor.

Further, when an input changing voltage increases to a voltage higher than an input reference voltage from a voltage lower than it and an increasing speed of the changing voltage is relatively slow due to a peculiar characteristic of the voltage comparator, the output as the comparison result does not sharply change to the negative pole or zero pole from the positive pole at a certain time point due to the peculiar characteristic of the voltage comparator, but the output enters a changing status from the positive pole to the negative pole or zero pole, namely, a bouncing status through a status in which the comparison output becomes the positive pole and the negative pole or zero pole again and again for a short time period.

When the window opening and closing motor is switched to a driving status or a non-driving status based on the output as the comparison result in the bouncing status, the window opening and dosing motor is switched to the driving status or the non-driving status in accordance with the bouncing status of the output as the comparison result. Consequently, to the user the motor seems like it operates erroneously. In particular, when the window opening and closing motor is switched to the non-driving status (the motor stops driving) based on the output as the comparison result in the bouncing status, anarc is generated between contacts under the influence of the bouncing status and the contacts have a high temperature or a contact material is fused, by use of a contact-type switching element as an operation switching element. Thus, the life of the contact-type switching element is short.

In order to improve the above-mentioned adverse influence, means for connecting a feedback resistor between a non-inverse input terminal and an output terminal of the voltage comparator is well known. However, the means cannot completely improve the bouncing status which is caused in the output as the comparison result of the voltage comparator. Accordingly, the above means and another means must be used together, a large number of circuit parts are necessary in accordance with the simultaneous use of both the means, the circuit structure is complicated, and manufacturing costs are increased.

SUMMARY OF THE INVENTION

The present invention is devised in consideration of the foregoing technical background. It is an object of the present invention to provide a motor driving circuit which can always drive the motor and stop driving the motor with accuracy when the surrounding environment changes.

In order to accomplish the above-mentioned object, according to the present invention, a motor driving circuit includes: an opening switch which drives opening operation of an opening and closing member; a closing switch which drives closing operation of the opening and closing member; an auto switch which automatically drives the opening and closing member to a predetermined position; a motor which drives the opening and closing member by operating the opening switch, the closing switch, or the auto switch; a charging circuit which charges a first capacitance element by a first CR time constant when the opening switch is operated; and a discharging circuit which charges a second capacitance element when the auto switch is operated and which discharges a discharging voltage charged to the second capacitance element by a second CR time constant when the operation of the auto switch stops, wherein driving operation of the motor stops when a charging voltage of the first capacitance element is charged to a voltage higher than a first reference voltage or when the discharging voltage of the second capacitance is discharged to a voltage lower than a second reference voltage, upon the driving operation of the motor.

With the above-described structure, the motor driving circuit includes the charging circuit for charging the first capacitance element by the first CR time constant and the discharging circuit for discharging the discharging voltage charged to the second capacitance element by the second CR time constant. The driving operation of the motor and the stop operation thereof are set by use of both the charging voltage of the first capacitance element in the charging circuit and the discharging voltage of the second capacitance in the discharging circuit. Therefore, when the surrounding environment changes due to the fluctuation of the surrounding temperature and the change in surrounding environment influences on the charging characteristic of the first capacitance element in the charging circuit and on the discharging characteristic of the second capacitance element in the discharging circuit, the effects on the charging circuit from the above change and on the discharging circuit are reverse to each other and they are mutually eliminated. Thus, it is capable of obtaining the motor driving circuit which drives the motor and stops the driving operation thereof with accuracy, entirely without the influence of the surrounding environment.

Further, with the above structure, in the motor driving circuit, time for requiring that the charging voltage of the first capacitance element reaches the first reference voltage after operating the opening switch is set to be longer than time for requiring that the opening and closing member reaches the predetermined position.

Alternatively, in the motor driving circuit, time for requiring that the discharging voltage of the second capacitance element reaches the second reference voltage after stopping the auto switch is set to be longer than time for requiring that the opening and closing member reaches the predetermined position.

With the structure, the opening and closing member can accurately move to the predetermined position.

Further, the motor driving circuit includes the operation switching element which switches the operation of the motor, and the charging voltage of the first capacitance element and the discharging voltage of the second capacitance element are discharged via the operation switching element. Consequently, the influence of the bouncing status is eliminated.

Furthermore, according to the present invention, the operation switching element is a relay having a driving coil and a bipolar switching type contact in addition to the foregoing structure, so that the charging voltage of the first capacitance element and the discharging voltage of the second capacitance element are discharged via the driving coil. Since the charging voltage of the first capacitance element and the discharging voltage of the second capacitance element are discharged via the driving coil in the relay, the structure is extremely simple.

In order to accomplish the object, a motor driving circuit includes: an opening switch which drives opening operation of an opening and closing member; a closing switch which drives closing operation of the opening and closing member; an auto switch which automatically drives the opening and closing member to a predetermined position; a motor which drives the opening and closing member by operating the opening switch, the closing switch, or the auto switch; an operation switching element which is connected to the motor and switches operation of the motor; a charging circuit which charges the first capacitance element when the opening switch is operated; and a voltage comparator which compares a charging voltage of the charging circuit with a reference voltage, wherein an output from the voltage comparator stops driving operation of the motor and the charging voltage of the charging circuit is discharged via the operation switching element when the charging voltage of the charging circuit reaches a voltage higher than the first reference voltage upon the driving operation of the motor.

With the above-described structure, the motor driving circuit includes the charging circuit which charges the capacitance element upon operating the switch for opening the opening and closing member and the voltage comparator which compares the charging voltage of the charging circuit with the reference voltage. When the charging voltage of the charging circuit increases to the reference voltage upon driving the motor, the output as the comparison result generated from the voltage comparator stops the driving operation of the motor and the charging voltage of the charging circuit is discharged via the operation switching element. Thus, the output as the comparison result of the voltage comparator is in the bouncing status. When the operation switching element stops the driving operation of the motor in accordance with the bouncing status of the output as the comparison result, at this time point, the charging voltage of the charging circuit is discharged via the operation switching element. Consequently, the bouncing status of the output as the comparison result is masked by this discharging operation and the operation switching element promptly stops the driving operation at a certain time point without the influence of the bouncing status. A user does not sense that the window opening and closing motor is erroneously operated.

The charging voltage of the charging circuit is discharged via the operation switching element so as to eliminate the influence of the bouncing status. Hence, a large number of circuit parts are not required and the circuit configuration is not complicated.

Further, in addition to the above structure, the operation switching element is a relay having a driving coil and a bipolar switching type contact, and the charging voltage of the charging circuit is discharged via the driving coil in the relay according to the invention.

With the above structure, since the charging voltage of the charging circuit is discharged via the driving coil in the relay, the circuit configuration is extremely simple.

Further, in addition to the above structure, when the motor is driven, the time for requiring that the charging voltage of the charging circuit reaches the reference voltage is set to be longer than the time for requiring that the opening and closing member reaches the predetermined position.

With the above-described structure, the opening and closing member moves to the predetermined position without fail.

BRIEF DESCRIPTION OF THE DRAWINGS

FIG. 2 is a characteristic diagram showing examples of operating statuses and voltage waveforms of units in the motor driving circuit shown in FIG. 1.

DESCRIPTION OF THE PREFERRED EMBODIMENTS

Figure 1:
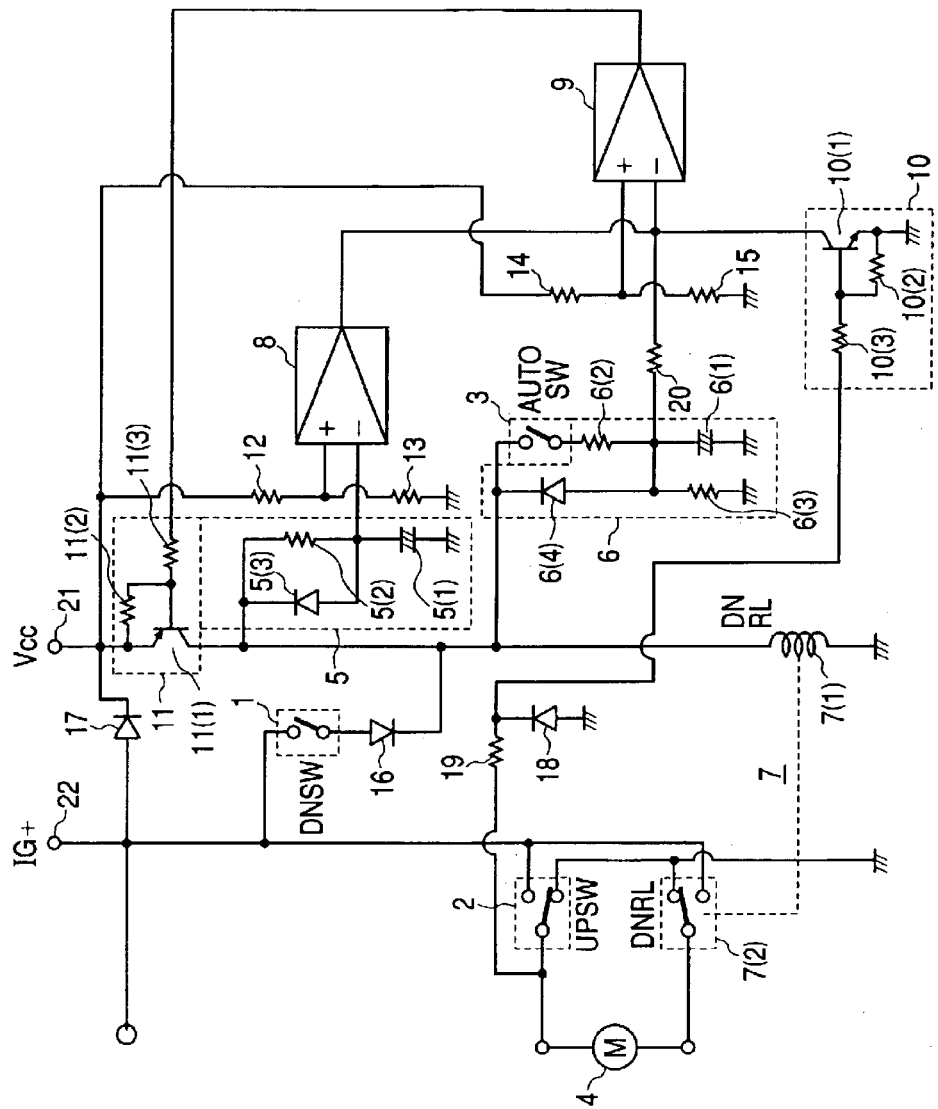
FIG. 1 is a circuit diagram showing the structure of a motor driving circuit according to an embodiment of the present invention.

The next description turns to embodiments of the present invention with reference to the drawings.

FIG. 1 is a circuit diagram showing the structure of the motor driving circuit according to an embodiment of the present invention.

Referring to FIG. 1, the motor driving circuit according to the embodiment includes: a window opening (down) switch (DNSW) 1 (opening and closing member) having a monopolar contact; a window closing (up) switch (UPSW) 2 (opening and closing member) having a bipolar switching contact; an auto switch (AUTOSW) 3 having a monopolar contact; a window opening and closing motor (M) 4 (opening and closing member); a charging circuit 5 including a capacitance element 5(1), a resistor 5(2), and a diode 5(3); a discharging circuit 6 including a capacitance element 6(1), resistors 6(2) and 6(3), and a diode 6(4); a down relay (DNRL) 7 as an operation switching element including a driving coil 7(1) and a bipolar switching type contact 7(2); a first open collector type voltage comparator 8; a second open collector type voltage comparator 9; a first transistor stage 10 including a transistor 10(1), a base resistor 10(2), and a serial resistor 10(3); and a second transistor stage 11 including a transistor 11(1), a base resistor 11(2), and a serial resistor 11(3). Further, the motor driving circuit includes: voltage-dividing resistors 12, 13, 14, 15; buffering diodes 16 and 17; a voltage-limiting diode 18; serial resistors 19 and 20; a power supply terminal (Vcc) 21; and an ignition terminal (IG) 22.

One end of the window opening switch 1 is connected to the ignition terminal 22 and another end thereof is connected to a collector of the transistor 11(1) and one end of the driving coil 7(1) via the buffering diode 16. A movable contact of the window closing switch 2 is connected to one end of the window opening and closing motor 4, a fixing contact for a continuously opening operation thereof is connected to the ignition terminal 22, and a fixing contact for a continuously closing operation thereof is connected to the ground. One end of the auto switch 3 is connected to the collector of the transistor 11(1) and the one end of the driving coil 7(1), and another end thereof is connected to one end of the resistor 6(2) in the discharging circuit 6.

An input terminal of the charging circuit 5 is connected to the collector of the transistor 11(1) and the one end of the driving coil 7(1), and an output terminal thereof is connected to an inverse input terminal of the first open collector type voltage comparator 8. Between the input terminal and the output terminal of the charging circuit 5, the resistor 5(2) and the diode 5(3) are connected in parallel and, between the output terminal and the ground point, the capacitance element 5(1) is connected. An input terminal of the discharging circuit 6 is connected to the collector of the transistor 11(1) and the one end of the driving coil 7(1), and an output terminal thereof is connected to an inverse input terminal of the second open collector type voltage comparator 9 via the serial resistor 20. Between the input terminal and the output terminal of the discharging circuit 6, the diode 6(4) is connected and, in parallel therewith, a serial circuit of the resistor 6(2) and the externally connected auto switch 3 is connected. Between the output terminal and the ground point, the capacitance element 6(1) and the resistor 6(3) are connected in parallel.

In the down relay 7 as the operation switching element, another end of the driving coil 7(1) is connected to the ground, a movable contact of the bipolar switching type contact 7(2) is connected to another end of the window opening and closing motor 4, a fixing contact for a continuously closing operation thereof is connected to the ground point, and a fixing contact for a continuously opening operation thereof is connected to the ignition terminal 22. A non-inverse input terminal of the first open collector type voltage comparator 8 is connected to voltage-dividing points of the voltage-dividing resistors 12 and 13 for supplying a first reference voltage Vref1 which are serially connected between the power supply terminal 21 and the ground point, and an output terminal thereof is connected to an inverse input terminal of the second open collector type voltage comparator 9. A non-inverse input terminal of the second open collector type voltage comparator 9 is connected to voltage-dividing points of the voltage-dividing resistors 14 and 15 for supplying a second reference voltage Vref2 which are serially connected between the power supply terminal 21 and the ground point, and an output terminal thereof is connected to an input terminal of the second transistor stage 11.

In the first transistor stage 10, an input terminal thereof is connected to the one end of the window opening and closing motor 4 via the serial resistor 19, and an output terminal thereof is connected to an inverse input terminal of the second open collector type voltage comparator 9. Further, the input terminal is connected to a base of the transistor 10(1) via the serial resistor 10(3) and is connected to the ground point via the base resistor 10(2), and the output terminal is connected to a collector of the transistor 10(1). Moreover, an emitter of the transistor 10(1) is connected to the ground point. In the second transistor stage 11, its input terminal is connected to an output terminal of the second open collector type voltage comparator 9. A base of the transistor 11(1) is connected to the input terminal via the serial resistor 11(3), a collector thereof is connected to the one end of the driving coil 7(1) in the down relay 7, and an emitter thereof is connected to the power supply terminal 21.

The buffering diode 17 is connected between the power supply terminal 21 and the ignition terminal 22. The voltage-limiting diode 18 is connected between the input terminal of the first transistor stage 10 and the ground point.

FIG. 2 is a characteristic diagram showing examples of operating statuses and voltage waveforms in units of the motor driving circuit shown in FIG. 1.

Referring to FIG. 2, a first waveform shows an operating status of the window opening switch 1, a numeric value 0 denotes a non-operating time and a numeric value 1 denotes an operating time. A second waveform shows an operating status of the auto switch 3, similarly, the numeric value 0 denotes the non-operating time, and the numeric value 1 denotes the operating time. A third waveform shows a changing status of an inter-terminal voltage of the capacitance element 5(1) in the charging circuit 5. A fourth waveform shows a changing status of an inter-terminal voltage of the capacitance element 6(1) in the discharging circuit 6. A fifth waveform shows a switching status of the bipolar switching type contact 7(2) in the down relay 7, the numeric value 0 denotes a status in which the movable contact is switched to the fixing contact for the continuously closing operation, and the numeric value 1 denotes a status in which the movable contact is switched to the fixing contact for the continuously opening operation. The axis of abscissas in FIG. 2 denotes time.

The operation of the motor driving circuit will be described with reference to FIGS. 1 and 2.

In an example of the operation, it is assumed that the supplied voltage of the ignition terminal 22 is (+12)V similar to the supplied voltage of the power supply terminal 21. In an initial status in which the window opening switch 1, the window closing switch 2, and the auto switch 3 are not operated, the contacts of the window opening switch 1 and the auto switch 3 are opened. Further, as shown in FIG. 1, the movable contact of the window closing switch 2 is switched to the fixing contact for the continuously closing operation and the movable contact of the bipolar switching type contact 7(2) in the down relay 7 is switched to the fixing contact for the continuously closing operation. Furthermore, in the initial status, no voltage is charged to the capacitance element 5(1) in the charging circuit 5 and to the capacitance element 6(1) in the discharging circuit 6.

At time $t_0$, the window opening switch 1 is operated as shown by the first waveform in FIG. 2 and then the voltage of (+12)V of the ignition terminal 22 is supplied to the driving coil 7(1) in the down relay 7 via the closed window opening switch 1 and the buffering diode 16. As shown by the fifth waveform in FIG. 2, the energization of the driving coil 7(1) switches the movable contact of the bipolar switching type contact 7(2) to the fixing contact for the continuously opening operation, the driving current thus flows to one end (top terminal in FIG. 1) of the window opening and closing motor 4 from another end (bottom terminal in FIG. 1), and the window opening and closing motor 4 rotates in another direction. The window starts to move in the down direction (namely, opening direction of the window) by rotating the window opening and closing motor 4 in the other direction. Further, the voltage of (+12)V of the ignition terminal 22 is supplied to the charging circuit 5 and the capacitance element 5(1) starts to be charged via the resistor 5(2). Then, as shown by the third waveform in FIG. 2, an inter-terminal voltage of the capacitance element 5(1) sequentially increases in accordance with the first CR time constant determined depending on a capacitance C of the capacitance 5(1) and a resistance R of the resistor 5(2).

At this time, the first open collector type voltage comparator 8 is opened and the second open collector type voltage comparator 9 is also opened. Thus, output current does not sink and the transistor 11(1) of the second transistor stage 11 is in the off-status.

Next, as shown by the second waveform in FIG. 2, the window opening switch 1 is operated and the auto switch 3 is also operated at time $t_1$. Then, in addition to the above-stated operation, the voltage of (+12)V of the ignition terminal 22 is supplied to the discharging circuit 6 via the closed auto switch 3 and the capacitance element 6(1) is charged via the resistance 6(2). At this time point, as shown by the fourth waveform in FIG. 2, the capacitance element 6(1) is charged for a relatively short time period and an inter-terminal voltage (discharging voltage) thereof starts to sharply increase.

At this time point, the first open collector type voltage comparator 8 keeps the open status and the second open collector type voltage comparator 9 further keeps the open status. As a consequence, the output current does not sink and the transistor 11(1) in the second transistor stage 11 is off.

When the inter-terminal voltage of the capacitance element 6(1) is higher than the second reference voltage Vref2 supplied to the non-inverse input terminal of the second open collector type voltage comparator 9 for a time period from time $t_1$ to time $t_2$, the second open collector type voltage comparator 9 changes to the on-status from the open status and thus the output current sinks. Therefore, the transistor 11(1) in the second transistor stage 11 is on. When the transistor 11(1) is on and then the operations of the auto switch 3 and the window opening switch 1 stop, the voltage of (+12)V of the power supply terminal 21 or the voltage of (+12)V of the ignition terminal 22 via the buffering diode 17 is sequentially supplied to the charging circuit 5 and the driving coil 7(1) in the down relay 7 via the transistor 11(1) in the on-status. The charging circuit 5 and the down relay 7 maintain the same operating status as the just-before operating status.

As shown by the second waveform in FIG. 2, the auto switch 3 stops the operation at the time $t_2$ and then the power supply to the discharging circuit 6 is shut off. Thus, as shown by the fourth waveform in FIG. 2, the charging operation of the capacitance element 6(1) in the discharging circuit 6 stops and, on the contrary, the discharging voltage charged in the capacitance element 6(1) is sequentially discharged via the resistor 6(3). The discharging voltage charged in the capacitance element 6(1) gradually reduces in accordance with the second CR time constant determined depending on the capacitance C of the capacitance element 6(1) and the resistance R of the resistor 6(3).

At this time point, the first open collector type voltage comparator 8 still keeps the open status and the second open collector type voltage comparator 9 maintains the on-status.

At time $t_3$, the capacitance element 5(1) in the charging circuit 5 is continuously charged and the inter-terminal voltage (charging voltage) of the capacitance element 5(1) is over the first reference voltage Vref1 set by the voltage-dividing resistors 12 and 13, then, the first open collector type voltage comparator 8 changes to the on-status from the open status and the current sinks at the output terminal thereof. The sinking operation at the output terminal enables the acceleration of the discharging operation of the capacitance element 6(1) in the discharging circuit 6. After that, when the sharply discharging operation of the capacitance element 6(1) reduces the inter-terminal voltage (discharging voltage) of the capacitance element 6(1) to the second reference voltage Vref2 set by the voltage-dividing resistors 14 and 15 or less for a short time, the second open collector type voltage comparator 9 in the on-status changes to the open status again and the current does not sink at the output terminal thereof. Then, the transistor 11(1) in the second transistor stage 11 enters the off-status and the power is not supplied to the charging circuit 5 and the driving coil 7(1) in the down relay 7.

In this case, the selection of the first CR time constant in the charging circuit 5 sets the time for charging the capacitance element 5(1) to the first reference voltage Vref1 to be longer than the time for requiring that the window (opening and closing member) moves to the entirely closing position (first predetermined position) or the entirely opening position (second predetermined position). Similarly, the selection of the second CR time constant in the discharging circuit 6 sets the time for requiring that the discharging voltage of the capacitance element 6(1) reaches the second reference voltage Vref2 to be longer than the time for requiring that the window (opening and closing member) moves to the entirely closing position (first predetermined position) or the entirely opening position (second predetermined position).

The above setting operation enables the window (opening and closing member) to accurately move to the entirely closing position (first predetermined position) or the entirely opening position (second predetermined position).

When the charging voltage inputted to the inverse input terminal of the first open collector type voltage comparator 8 is equal to or more than the first reference voltage Vref1 supplied to the non-inverse input terminal thereof and then the changing speed of the charging voltage is reduced, the first open collector type voltage comparator 8 promptly does not change the polarity upon changing to the on-status from the open status, in other words, upon changing the polarity of the output as the comparison result of the first open collector type voltage comparator 8. Further, the bouncing status is caused and thus the polarity repeatedly changes for a short time period and thereafter the polarity changes. When the bouncing status is caused in the output as the comparison result of the first open collector type voltage comparator 8, the bouncing status is caused at the non-inverse input terminal of the second open collector type voltage comparator 9 which receives the output as the comparison result. Under the influence of the bouncing status, the output as the comparison result of the second open collector type voltage comparator 9 enters the bouncing status. In addition, the bouncing status is caused in the transistor 11(1) in the second transistor stage 11 to which the output as the comparison result is supplied. The transistor 11(1) promptly does not enter the off-status but the bouncing status. The output voltage becomes the voltage in the bouncing status and the voltage in the bouncing status is supplied to the driving coil 7(1) in the down relay 7.

At the time point at which the voltage in the bouncing status is supplied to the driving coil 7(1), in the charging circuit 5, the charging voltage of the capacitance element 5(1) is promptly discharged via the diode 5(3) and the driving coil 7(1). Then, as shown by the third waveform in FIG. 2, the charging voltage sharply reduces. In this case, the charging voltage promptly supplied to the driving coil 7(1) is equal to or more than the bouncing type output voltage so that it masks the bouncing type output voltage. Therefore, the bouncing type output voltage does not affect the driving coil 7(1) and the voltage is not promptly supplied to the driving coil 7(1) at certain time point. Upon shutting off the voltage supply to the driving coil 7(1), the movable contact of the bipolar switching type contact 7(2) is switched to the fixing contact for the continuously closing operation because of the termination of energization of the driving coil 7(1) as shown by the fifth waveform in FIG. 2. Thus, the driving current does not flow to the window opening and closing motor 4 and the window opening and closing motor 4 stops the rotation. As a result of the stop of rotation of the window opening and closing motor 4, the window does not move in the down direction (namely, in the opening direction of the window).

Accordingly, the motor driving circuit according to the embodiment includes the charging circuit 5 and the discharging circuit 6, and the driving operation and the stop of the motor 4 are set by use of both the charging voltage of the charging circuit 5 and the discharging voltage of the discharging circuit 6. The fluctuation of the surrounding temperature and the like change the surrounding environment. When the change in surrounding environment influences on the charging characteristic of the first capacitance element 5(1) in the charging circuit 5 and the discharging characteristic of the second capacitance element 6(1) in the discharging circuit 6, the effects on the charging circuit 5 and the discharging circuit 6 are reverse to each other and they are mutually eliminated. Thus, it is capable of obtaining the motor driving circuit, entirely without the influence of the surrounding environment.

Although the opening and closing member uses the window according to the embodiment, it may be a member similar to a sunroof door of an automobile or a sliding door of the automobile.

The auto switch is operated interlockingly with the window opening switch according to the embodiment. However, the present invention can be applied to a motor driving circuit in which the auto switch is operated interlockingly with the window closing switch.

As described above, according to the present invention, the motor driving circuit includes the charging circuit for charging the first capacitance element by the first CR time constant and the discharging circuit for discharging the discharging voltage charged to the second capacitance element by the second CR time constant. The driving operation of the motor and the stop operation thereof are set by use of both the charging voltage of the first capacitance element in the charging circuit and the discharging voltage of the second capacitance in the discharging circuit. Therefore, when the surrounding environment changes due to the fluctuation of the surrounding temperature and the change in surrounding environment influences on the charging characteristic of the first capacitance element in the charging circuit and on the discharging characteristic of the second capacitance element in the discharging circuit, the effects on the charging circuit from the above change and on the discharging circuit are reverse to each other and they are mutually eliminated. Thus, it is capable of obtaining the motor driving circuit which drives the motor and stops the driving operation thereof with accuracy, entirely without the influence of the surrounding environment.

What is claimed is:

1. A motor driving circuit comprising:
   an opening switch which drives an opening operation of an opening and closing member;
   a closing switch which drives a closing operation of the opening and closing member;
   an auto switch which automatically drives the opening and closing member to a predetermined position;

a motor which drives the opening and closing member by operating one of the opening switch, the closing switch, and the auto switch;

a charging circuit which charges a first capacitance element by a first CR time constant when the opening switch is operated; and a discharging circuit which charges a second capacitance element when the auto switch is operated and which discharges a discharging voltage charged to the second capacitance element by a second CR time constant when the operation of the auto switch stops, wherein a driving operation of the motor stops one of when a charging voltage of the first capacitance element Is charged to a voltage higher than a first reference voltage and when the discharging voltage of the second capacitance is discharged to a voltage lower than a second reference voltage, upon the driving operation of the motor.

2. The motor driving circuit according to claim 1, wherein a time for requiring that the charging voltage of the first capacitance element reaches the first reference voltage after operating the opening switch is set to be longer than a time for requiring that the opening and closing member reaches the predetermined position.

3. The motor driving circuit according to claim 1, wherein a time for requiring that the discharging voltage of the second capacitance element reaches the second reference voltage after stopping the auto switch is set to be longer than a time for requiring that the opening and closing member reaches the predetermined position.

4. The motor driving circuit according to claim 1, further comprising:

an operation switching element which is connected to the motor and switches operation of the motor, wherein one of the charging voltage of the first capacitance element and the discharging voltage of the second capacitance element is discharged via the operation switching element.

5. The motor driving circuit according to claim 4, wherein the operation switching element is a relay having a driving coil and a bipolar switching type contact, and wherein the charging voltage of the first capacitance element and the discharging voltage of the second capacitance element are discharged via the driving coil in the relay.

6. A motor driving circuit comprising:

an opening switch which drives an opening operation of an opening and closing member;

a closing switch which drives a closing operation of the opening and closing member;

an auto switch which automatically drives the opening and closing member to a predetermined position;

a motor which drives the opening and closing member by operating one of the opening switch, the closing switch, and the auto switch;

an operation switching element which is connected to the motor and switches operation of the motor;

a charging circuit which charges a first capacitance element when the opening switch is operated; and a voltage comparator which compares a charging voltage of the charging circuit with a reference voltage, wherein an output from the voltage comparator stops driving operation of the motor and the charging voltage of the charging circuit is discharged via the operation switching element when the charging voltage of the charging circuit reaches a voltage higher than the first reference voltage upon the driving operation of the motor.

7. The motor driving circuit according to claim 6, wherein the operation switching element is a relay having a driving coil and a bipolar switching type contact, and wherein the charging voltage of the charging circuit is discharged via the driving coil in the relay.

8. The motor driving circuit according to claim 6, wherein a time for requiring that the charging voltage of the charging circuit reaches the first reference voltage is set to be longer than a time for requiring that the opening and closing member reaches the predetermined position during driving of the motor.

9. The motor driving circuit according to claim 7, wherein a time for requiring that the charging voltage of the charging circuit reaches the first reference voltage is set to be longer than a time for requiring that the opening and closing member reaches the predetermined position during driving of the motor.

* * * * *

UNITED STATES PATENT AND TRADEMARK OFFICE
CERTIFICATE OF CORRECTION

PATENT NO.     : 6,836,088 B2
DATED          : December 28, 2004
INVENTOR(S)    : Minoru Hiwatari It is certified that error appears in the above-identified patent and that said Letters Patent is hereby corrected as shown below:

Column 11,
Lines 5 and 10, delete "CR" and substitute -- RC -- in its place;
Lines 4 and 29, before "time" delete "a" and substitute -- the -- in its place;
Line 14, after "element" delete "Is" and substitute -- is -- in its place.
Line 20, before "time" delete "a" and substitute -- the -- in its place (both occurrences);

Column 12,
Lines 32, 34, 38 and 40, before "time" delete "a" ans substitute -- the -- in its place;

Signed and Sealed this

Twenty-fourth Day of May, 2005

JON W. DUDAS
*Director of the United States Patent and Trademark Office*